US006876526B2

(12) United States Patent
Macken et al.

(10) Patent No.: US 6,876,526 B2
(45) Date of Patent: Apr. 5, 2005

(54) BILAYER SHARED POLE EXTENSION FOR REDUCED THERMAL POLE TIP PROTRUSION

(75) Inventors: Declan Macken, Prior Lake, MN (US); Christopher John Cote, Eden Prairie, MN (US); Ladislav Rudolf Pust, Savage, MN (US); Vee Sochivy Kong, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 177 days.

(21) Appl. No.: 10/241,431

(22) Filed: Sep. 11, 2002

(65) Prior Publication Data

US 2003/0231425 A1 Dec. 18, 2003

Related U.S. Application Data

(60) Provisional application No. 60/387,983, filed on Jun. 12, 2002.

(51) Int. Cl.⁷ ............................. G11B 5/127; G11B 5/33

(52) U.S. Cl. ................................. 360/324.12; 360/126

(58) Field of Search .................... 360/324.1, 324.11, 360/324.12, 126, 125, 317, 120, 121

(56) References Cited

U.S. PATENT DOCUMENTS

| 4,853,810 A | 8/1989 | Pohl et al. ................... 360/103 |
|---|---|---|
| 5,021,906 A | 6/1991 | Chang et al. ................ 360/103 |
| 5,283,942 A | 2/1994 | Chen et al. ..................... 29/603 |
| 5,303,105 A | 4/1994 | Jorgenson .................... 360/106 |
| 5,314,596 A * | 5/1994 | Shukovsky et al. ....... 204/192.2 |
| 5,377,058 A | 12/1994 | Good et al. ..................... 360/75 |
| 5,452,164 A | 9/1995 | Cole et al. ................... 360/113 |
| 5,636,088 A | 6/1997 | Yamamoto et al. .......... 360/104 |
| 5,640,753 A | 6/1997 | Schultz et al. ............ 29/603.08 |
| 5,663,856 A | 9/1997 | Packard ....................... 360/122 |
| 5,710,683 A | 1/1998 | Sundaram .................... 360/126 |
| 5,771,570 A | 6/1998 | Chhabra et al. .......... 29/603.06 |
| 5,793,207 A | 8/1998 | Gill .............................. 324/252 |
| 5,896,243 A | 4/1999 | Koshikawa et al. ......... 360/103 |
| 5,896,244 A | 4/1999 | Watanabe et al. ............ 360/103 |
| 5,898,542 A | 4/1999 | Koshikawa et al. ......... 360/103 |
| 5,909,340 A | 6/1999 | Lairson et al. .............. 360/104 |
| 5,949,627 A | 9/1999 | Williams et al. ............. 360/126 |
| 5,991,113 A | 11/1999 | Meyer et al. ................... 360/75 |
| 6,074,566 A | 6/2000 | Hsiao et al. .................... 216/2 |
| 6,078,455 A | 6/2000 | Enarson et al. ............... 360/68 |
| 6,154,952 A | 12/2000 | Tangren .................... 29/603.04 |

(Continued)

OTHER PUBLICATIONS

U.S. Appl. No. 09/649,985, filed Aug. 29, 2000, Shukh et al.
U.S. Appl. No. 09/664,270, filed Sep. 18, 2000, Shukh et al.
U.S. Appl. No. 09/605,080, filed Jun. 26, 2000, Shukh.
R.M Bozorth, Ferromagnetism, *IEEE Press*.
H. Masumoto, 'On the Thermal Expansion of the Alloys of Iron, Nickel, and cobalt and the Cause of the Small Expansibility of Alloys of the Invar Type', *Science Reports of the Tohoku Imperial University*, vol. XX, 1931.

Primary Examiner—George Letscher
Assistant Examiner—Christopher R. Magee
(74) Attorney, Agent, or Firm—Kinney & Lange, P.A.

(57) ABSTRACT

A transducing head formed upon a slider has an air bearing surface, a top magnetic pole, a shared magnetic pole, a write via, and a shared pole extension. The write via is positioned opposite the air bearing surface and extends between the top magnetic pole and the shared magnetic pole. The shared pole extension is positioned adjacent the air bearing surface and extends from the shared magnetic pole toward the top magnetic pole. The shared pole extension is separated from the top magnetic pole by a write gap. The shared pole extension is formed of a multilayer having a layer of a first material having a high magnetic moment and a layer a second material having a coefficient of thermal expansion substantially similar to a coefficient of thermal expansion of the slider material.

20 Claims, 3 Drawing Sheets

U.S. PATENT DOCUMENTS

| | | | |
|---|---|---|---|
| 6,212,040 B1 | 4/2001 | Hungerford | 360/221 |
| 6,252,741 B1 | 6/2001 | Ahn | 360/235.1 |
| 6,259,583 B1 * | 7/2001 | Fontana et al. | 360/126 |
| 6,366,428 B1 | 4/2002 | Yamanaka et al. | 360/126 |
| 6,441,994 B1 | 8/2002 | Wang et al. | 360/123 |
| 6,661,605 B1 * | 12/2003 | Pust et al. | 360/126 |
| 6,721,138 B1 * | 4/2004 | Chen et al. | 360/317 |
| 2002/0006018 A1 | 1/2002 | Narumi et al. | 360/317 |
| 2003/0086215 A1 * | 5/2003 | Kief et al. | 360/319 |
| 2003/0202278 A1 * | 10/2003 | Chen et al. | 360/126 |

* cited by examiner

BILAYER SHARED POLE EXTENSION FOR REDUCED THERMAL POLE TIP PROTRUSION

CROSS-REFERENCE TO RELATED APPLICATION(S)

This application claims the priority from provisional U.S. patent application 60/387,983, filed on Jun. 12, 2002 for "Bilayer Shared Pole Extension for Reduced Thermal Pole Tip Protrusion" of Declan Macken, Christopher John Cote, Ladislav Rudolf Pust, and Vee Sochivy Kong, which application is hereby incorporated by reference in its entirety.

BACKGROUND OF THE INVENTION

The present invention relates generally to the field of magnetic data storage and retrieval systems. In particular, the present invention relates to a thin film transducing head having a bilayer shared pole extension for reduced thermal pole tip protrusion.

In a magnetic data storage and retrieval system, a thin film transducing head typically includes a transducer and a substrate upon which the transducer is built. The transducer, which typically includes a writer portion for storing magnetically-encoded information on a magnetic media and a reader portion for retrieving that magnetically-encoded information from the magnetic media, is formed of multiple layers successively stacked upon the substrate. The volume of the transducer is typically much smaller than the volume of the substrate.

The layers of the transducer, which include both metallic and insulating layers, all have differing mechanical and chemical properties than the substrate. These differences in properties affect several aspects of the transducer. First, the layers of the transducing head will be lapped at different rates. Thus, when an air bearing surface (ABS) of the transducing head is lapped during its fabrication, differing amounts of the layers will be removed—resulting in the transducing head having a uneven ABS. Commonly, a greater amount of the metallic layers of the transducer will be removed during the lapping process than will be removed from the substrate. Thus, this lapping process results in a Pole Tip Recession (PTR) of the metallic layers of the transducer with respect to the substrate. The PTR of a particular layer is defined as the distance between the air bearing surface of the substrate and the air bearing surface of that layer.

The differing mechanical and chemical properties of the substrate and transducer layers further affect the air bearing surface during operation of the transducing head. As the magnetic data storage and retrieval system is operated, the transducing head is subjected to increasing temperatures within the magnetic data storage and retrieval system. In addition, a temperature of the transducing head itself, or a part thereof, may be significantly higher than the temperature within the magnetic data storage and retrieval system due to heat dissipation caused by electrical currents in the transducer.

The coefficient of thermal expansion (CTE) of materials used in forming the substrate is typically much smaller than the CTE of materials used in forming the metallic layers of the transducer. Due to the larger CTE of the transducer's metallic layers, those layers will tend to expand a greater amount than will the substrate. Thus, when the transducing head is subjected to higher operating temperatures, the metallic layers tend to protrude closer to the magnetic disc than the substrate; thereby affecting the PTR of the transducer. This change in PTR caused by temperature is referred to as the Thermal PTR (T-PTR).

During operation of the magnetic data storage and retrieval system, the transducing head is positioned in close proximity to the magnetic media. A distance between the transducer and the media is preferably small enough to allow for writing to and reading from a magnetic medium having a large areal density, and great enough to prevent contact between the magnetic media and the transducer. Performance of the transducer depends primarily on this distance.

The effect of T-PTR on spacing between the transducing head and the magnetic media is more pronounced with metallic layers formed of a high magnetic moment material since such materials tend to have higher CTEs than other metallic materials. A conventional writer includes a shared pole, a top pole, a write via opposite the ABS that extends between the shared and top poles, and a shared pole extension that extends from the shared pole toward the top pole and is separated from the top pole by a write gap. Generally, to increase a strength of a write field produced across the write gap, and thereby promote greater areal densities in the magnetic media, a pole tip portion of the top pole adjacent the ABS and the shared pole extension are formed of a material having a magnetic moment greater than that of the materials forming the remaining metallic layers of the transducing head. However, such high magnetic moment materials tend to have a CTE greater than the more conventional metallic materials used in the transducing head. Thus, given the greater CTE of the high magnetic moment materials needed for the shared pole extension, the potential thermal expansion of the shared pole extension is particularly troublesome.

BRIEF SUMMARY OF THE INVENTION

A transducing head formed upon a slider has an air bearing surface, a top magnetic pole, a shared magnetic pole, a write via, and a shared pole extension. The write via is positioned opposite the air bearing surface and extends between the top magnetic pole and the shared magnetic pole. The shared pole extension is positioned adjacent the air bearing surface and extends from the shared magnetic pole toward the top magnetic pole. The shared pole extension is separated from the top magnetic pole by a write gap. The shared pole extension is formed of a multilayer having a layer of a first material having a high magnetic moment and a layer a second material having a coefficient of thermal expansion substantially similar to a coefficient of thermal expansion of the slider material.

DETAILED DESCRIPTION

Figure 1:
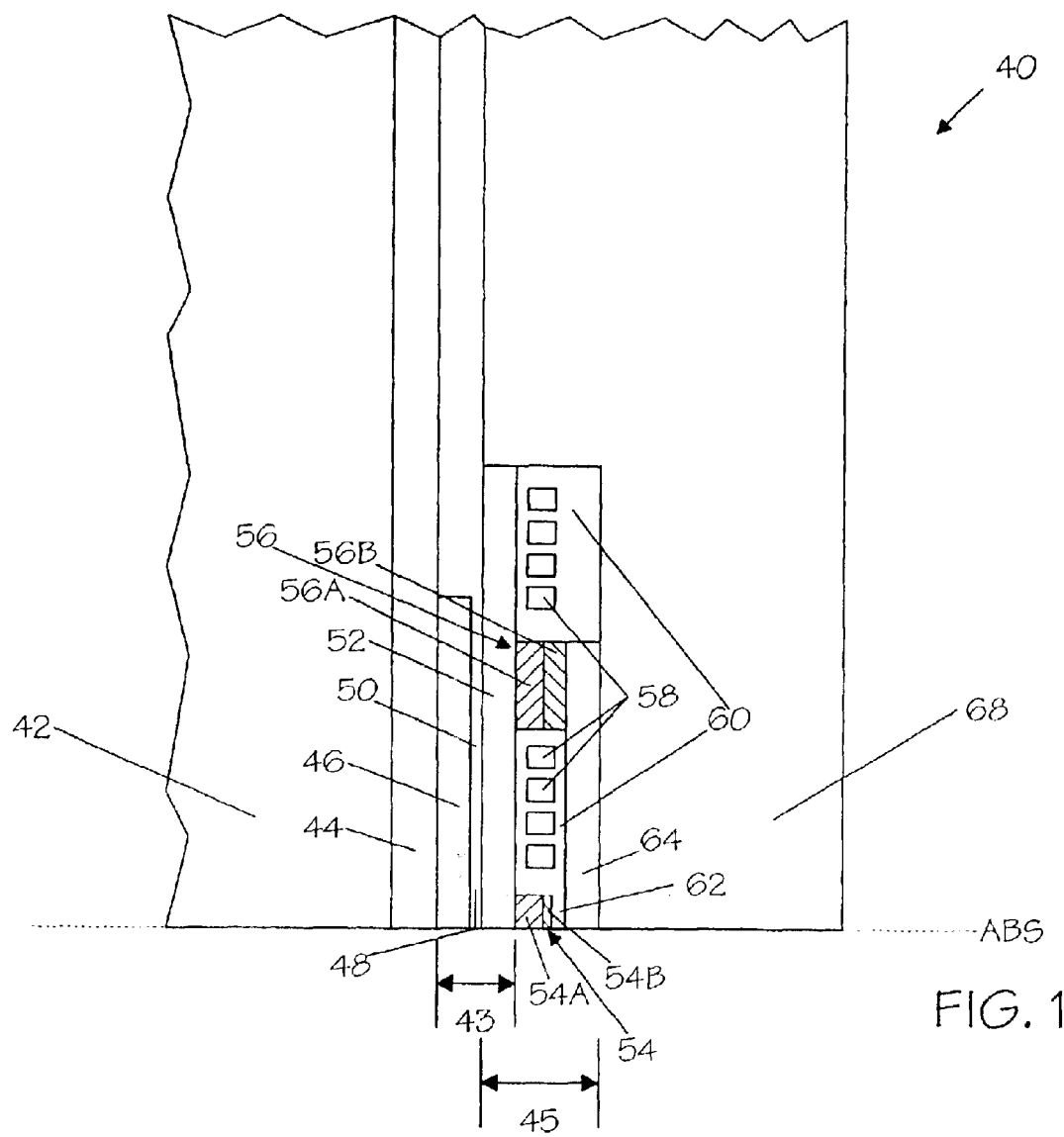
FIG. 1 is a partial cross-sectional view of a transducing head in accord with the present invention.

FIG. 1 is a partial cross-sectional view of transducing head 40 in accord with the present invention. The cross-section of FIG. 1 is taken substantially normal to an air bearing surface (ABS) of transducing head 40.

Transducing head 40 includes substrate 42, basecoat 44, reader 43 (which includes bottom shield 46, read element 48, read gap 50 and shared pole 52), writer 45 (which includes shared pole 52, shared pole extension 54 (formed of first shared pole extension 54A and second shared pole extension 54B), write via 56 (formed of first write via 56A and second write via 56B), conductive coil 58, coil insulator 60, write gap 62, and top pole 64), and overcoat 68.

Basecoat 44 is deposited on substrate 42. Reader 43 and writer 45 are each multi-layer devices which are stacked upon basecoat 44 adjacent the ABS of transducing head 40. As shown in FIG. 1, reader 43 is formed on basecoat 44, and writer 45 is both stacked on and merged with reader 43. In other embodiments not illustrated, reader 43 and writer 45 may be arranged in a piggyback configuration (in which layers are not shared between the two elements) and/or writer 45 may be formed on basecoat 44 (with reader 43 being formed on writer 45). Overcoat 68 is formed on writer 45.

Substrate 42 is typically formed of an electrically-conductive, ceramic material such as AlTiC, which has a coefficient of thermal expansion (CTE) typically in the range of about $7.0 \times 10^{-6}/°$ C. to about $8.3 \times 10^{-6}/°$ C.

Insulating basecoat 44 is formed on substrate 42. Basecoat 44 is generally formed of an insulating material, such as $Al_2O_3$. Generally, the insulating material for basecoat 44 is selected to most closely match the chemical and mechanical properties of the material used as substrate 42. For example, an $Al_2O_3$ basecoat 44 is commonly used in conjunction with an AlTiC substrate 42, since the two materials have similar CTEs.

Reader 43 is formed on basecoat 44, and includes bottom shield 46, read element 48, read gap 50 and shared pole 52. A read gap is defined on the ABS between terminating ends of bottom shield 46 and shared pole 52. Read element 48 is positioned in the read gap adjacent the ABS. Read gap 50 insulates read element 48 from bottom shield 46 and shared pole 52. Read element 48 may be any of a variety of different types of read elements, such as an anisotropic magnetoresistive (MR) read element or a giant magnetoresistive (GMR) read element. In operation, magnetic flux from a surface of a magnetic media causes rotation of a magnetization vector of a sensing layer of MR read element 48, which in turn causes a change in electrical resistivity of MR read element 48. The change in resistivity of read element 48 can be detected by passing a current through read element 48 and measuring a voltage across read element 48.

Writer 45 is formed on reader 43, and includes shared pole 52, shared pole extension 54, write via 56, conductive coil 58, coil insulator 60, write gap 62, and top pole 64. Shared pole extension 54 and write via 56 are formed on shared pole 52, with shared pole extension 54 being positioned adjacent the ABS and write via 56 being spaced away from the ABS. Write gap 62 is defined on the ABS between shared pole extension 54 and top pole 64. Top pole 64 extends from the ABS to write via 56. Conductive coil 58 is positioned in coil insulator 60 between shared pole 52 and top pole 64, wrapping around write via 56, such that the flow of electrical current through conductive coil 58 generates a magnetic field across write gap 62.

Each of bottom shield 46, shared pole 52, and top pole 64 are formed of metallic materials. Preferably, each of these components is formed of an alloy primarily composed of Fe, Ni and Co. Such metallic alloys typically have large CTEs. For example, $Ni_{79}Fe_{21}$ has a CTE of about $12.2 \times 10^{-6}/°$ C.

Shared pole extension 54 and write via 56 are each formed of a bilayer structure. Specifically, shared pole extension 54 is formed of first shared pole extension 54A adjacent shared pole 52 and second shared pole extension 54B adjacent write gap 62, while write via 56 is formed of first write via 56A adjacent shared pole 52 and second write via 56B adjacent top pole 64. Each of first shared pole extension 54A and first write via 56A is composed of a material having a CTE substantially similar to a CTE of the material comprising substrate 42. Examples of suitable materials having a CTE similar to AlTiC, which is commonly used to form substrate 42, include, but are not limited to, $Ni_{45}Fe_{55}$, $Ni_{31.5}Fe_{68.5}$, $Ni_{36.5}Co_{10}Fe_{53.5}$, $Ni_{28}Co_{10}Fe_{62}$, and $Ni_{28}Co_{20}Fe_{52}$. Each of second shared pole extension 54B and second write via 56B is formed of a material having a high magnetic moment, relatively high CTE material, such as NiFeCo.

Shared pole extension 54 and write via 56 can be formed by consecutively electroplating first shared pole extension 54A and second shared pole extension 54B through a single photoresist mask. For optimal effect in reducing T-PTR, a thickness of first shared pole extension 54A is preferably at least one third of a thickness of shared pole extension 54, but no more than two-thirds the thickness of shared pole extension 54. This upper limit is set by the need to obtain adequate write field strength, and by the dimensional tolerance of a process by which shared pole extension is planarized. Shared pole extension 54 and write via 56 may also be plated in two steps, in which a first photoresist mask is used to define first shared pole extension 54A and first write via 56A, and a second photoresist mask is used to define second shared pole extension 54B and second write via 56B. Although this second method is more costly, it allows for better optimization of the shape of high magnetic moment second shared pole extension 54B and for better control of the plating process.

Read gap 50 is generally formed of an insulating $Al_2O_3$. Coil 58 is typically formed of an electrically-conductive metal such as copper, gold or silver. Most commonly used is copper, which has a CTE of about $16.5 \times 10^{-6}/°$ C. Coil insulator 60 is generally formed from a cured photoresist having a large CTE, or from other insulating materials, such as AlN. Write gap 62 is generally formed of an insulating material such as $Al_2O_3$ or a cured photoresist. Insulating overcoat 68 formed over top pole 64 is typically formed of an insulating material, such as $Al_2O_3$. Not shown in FIG. 1 are electrical leads and contacts to read element 48 and coil 58. The electrical leads and contacts are typically formed of metals, such as copper, gold or silver, or metallic alloys.

The layers of transducing head 40 all have differing mechanical and chemical properties. Due to these differing properties, the layers of transducing head 40 will be lapped at different rates. Thus, the lapping of the ABS of transducing head 40 during fabrication results in transducing head 40 having a uneven ABS. Commonly, a greater amount of the metallic layers of transducing head 40 will be removed during the lapping process than will be removed from substrate 42, resulting in a Pole Tip Recession (PTR) of the metallic layers with respect to substrate 42. The PTR of a particular layer is defined as the distance between the air bearing surface of substrate 42 and the air bearing surface of that layer.

The differing mechanical and chemical properties of the layers of transducing head 40 further affect the air bearing surface of transducing head 40 during operation thereof. The coefficient of thermal expansion (CTE) of materials used in forming substrate 42 is typically much smaller than the CTE of materials used in forming the metallic layers of transducing head 40. Due to the larger CTE of the metallic layers, those layers will tend to expand a greater amount than will substrate 42. Thus, when transducing head 40 is subjected to higher operating temperatures, the metallic layers tend to protrude closer to the magnetic disc than substrate 42; thereby affecting the PTR of the metallic layers of transducing head 40. This change in PTR caused by temperature is referred to as the Thermal PTR (T-PTR).

The effect of T-PTR on spacing between transducing head 40 and the magnetic media (not sure in FIG. 1) is more pronounced with metallic layers formed of a high magnetic moment material. Conventionally, to increase a strength of a write field produced across write gap 62, and thereby promote greater areal densities in the magnetic media, shared pole extension 54 is formed of a material having a magnetic moment greater than that of the materials forming the remaining metallic layers of transducing head 40. However, such high magnetic moment materials tend to have a CTE greater than the more conventional metallic materials used in transducing head 40. Thus, given the greater CTE of the high magnetic moment materials needed for shared pole extension 54, the potential thermal expansion of shared pole extension 54 is particularly troublesome.

One option to decrease the effect of T-PTR associated with shared pole extension 54 is to use a lower magnetic moment material in forming shared pole extension 54. However, such a solution will compromise the effectiveness of writer 45 by preventing writer 45 from generating magnetic fields strong enough to write to the high coercivity magnetic media needed for high areal density recording. Today's writers use materials having magnetic moments as great as 2.2 Tesla for shared pole extension 54, while lower CTE metallic materials will have magnetic moments of about 1.5 Tesla.

A second option is to form shared pole extension 54 of a lower magnetic moment material, and to cover a surface of shared pole extension 54 adjacent write gap 62 with a frosting layer (that is, a very thin layer) of a high magnetic moment material. However, shared pole extension 54 with a frosting layer of a high magnetic moment material will not be sufficiently planar for accurate photo definition of top pole 64.

Thus, the present invention addresses the problem of T-PTR related to shared pole extension 54 by using a bilayer structure for shared pole extension 54. Specifically, second shared pole extension 54B adjacent write gap 62 is formed of a high magnetic moment to allow for the generation by writer 45 of magnetic fields sufficiently strong to write to high coercivity magnetic medium. The high CTE of this high magnetic moment material is compensated for with first shared pole extension 54A composed of a material having a CTE substantially similar to that of the material forming substrate 42.

Although a greater concern exists regarding T-PTR of shared pole extension 54 than with write via 56 since shared pole extension 54 resides adjacent the ABS, write via 56 suffers from similar thermal expansion problems. In fabricating transducing head 40, the simultaneous formation of shared pole extension 54 and write via 56 of the same material in a single step is simply more cost effective than the separate formation of write via 56 of a material having a lower magnetic moment. Accordingly, write via 56 similarly suffers from thermal expansion as shared pole extension 54. Thus, to ease thermal expansion issues of write via 56, and for ease of fabrication, write 56 is similarly formed of a bilayer.

An experiment comparing T-PTR of various writers indicates a significant reduction in T-PTR in the region of shared pole extension 54 when shared pole extension 54 is formed of a bilayer versus a high magnetic moment material. The following table summarizes the results of this experiment:

| Shield thickness | Shared Pole Ext | BS T-PTR | TS T-PTR | SPE T-PTR |
|---|---|---|---|---|
| 0.3 μm BS 0.1 μm TS | $Fe_{45}Ni_{55}$ w/2.2T FeCoNi frosting layer | 1.07 | 1.31 | 1.11 |
| 0.5 μm BS 0.2 μm TS | Bilayer of Fe45Ni55 and 2.2 T. FeCoNi | 1.34 | 1.46 | 1.17 |
| 0.5 μm BS 0.3 μm TS | 2.2 T. FeCoNi | 1.42 | 1.60 | 1.53 |
| 0.8 μm BS 0.3 μm TS | 2.21 T. FeCoNi | 1.70 | 1.77 | 1.6 |

Notably, the writer having its shared pole extension formed of $Fe_{45}Ni_{55}$ with a 2.2 Tesla FeCoNi frosting layer had the smallest shared pole extension T-PTR, followed closely by the writer having its shared pole extension formed of the bilayer of the present invention. The exemplary bilayer was formed of a 2 μm thick first shared pole extension 54A of $Fe_{45}Ni_{55}$ and a 1.3 μm thick second shared pole extension 54B of 2.2 Tesla FeCoNi. Also of note is that a reduction in a thickness of shared pole 52 also has a positive effect on T-PTR of shared pole 52.

Figure 2:
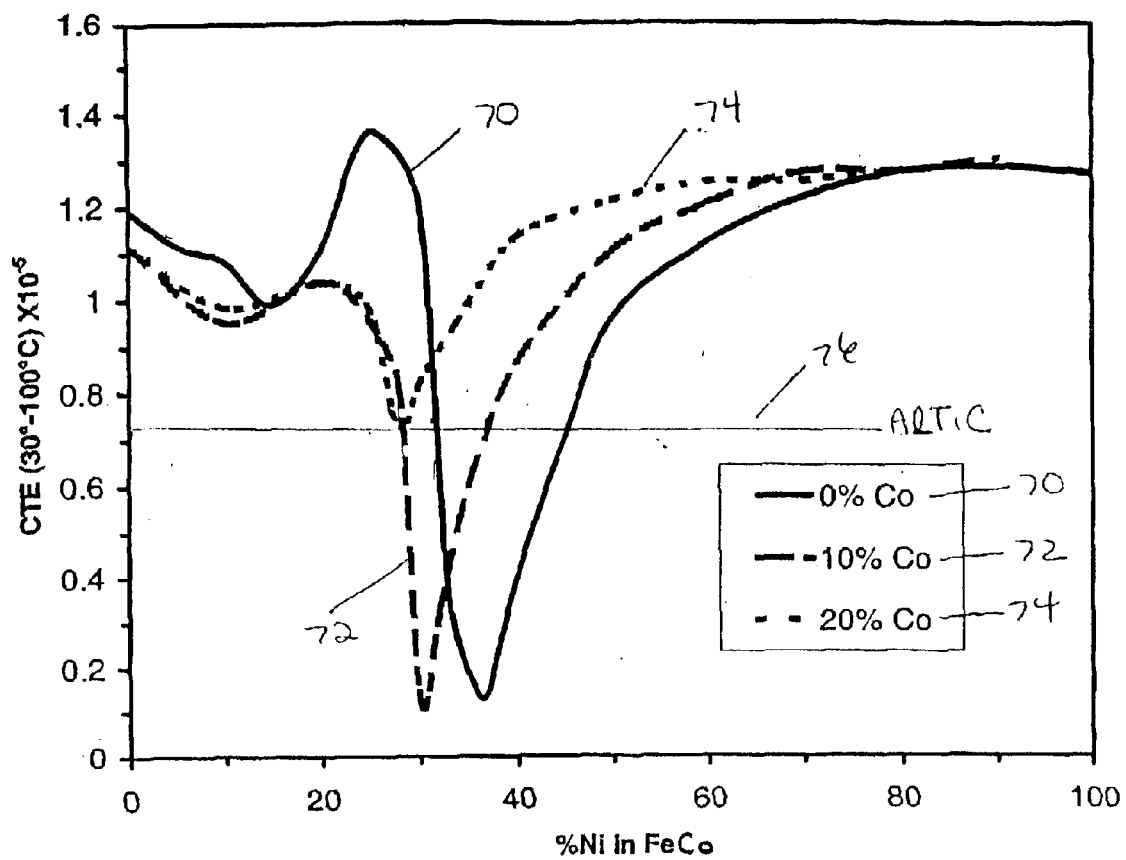
FIG. 2 is a graph detailing a CTE of various CoNiFe alloys.

FIG. 2 is a graph illustrating CTEs of various NiFeCo alloys. Included in FIG. 2 is curve 70 illustrating an effect of a percentage of nickel in a NiFe alloy, curve 72 illustrating an effect of a percentage of nickel in a NiFeCo alloy having 10% cobalt, and curve 74 illustrating an effect of a percentage of nickel in a NiFeCo alloy having 20% cobalt. Also illustrated in FIG. 2 is curve 76 illustrating the CTE of AlTiC, the material conventionally used in forming substrate 42. Thus, any alloy having a CTE substantially similar to AlTiC may be used as first shared pole extension 54A of a transducing head formed on an AlTiC substrate.

Figure 3:
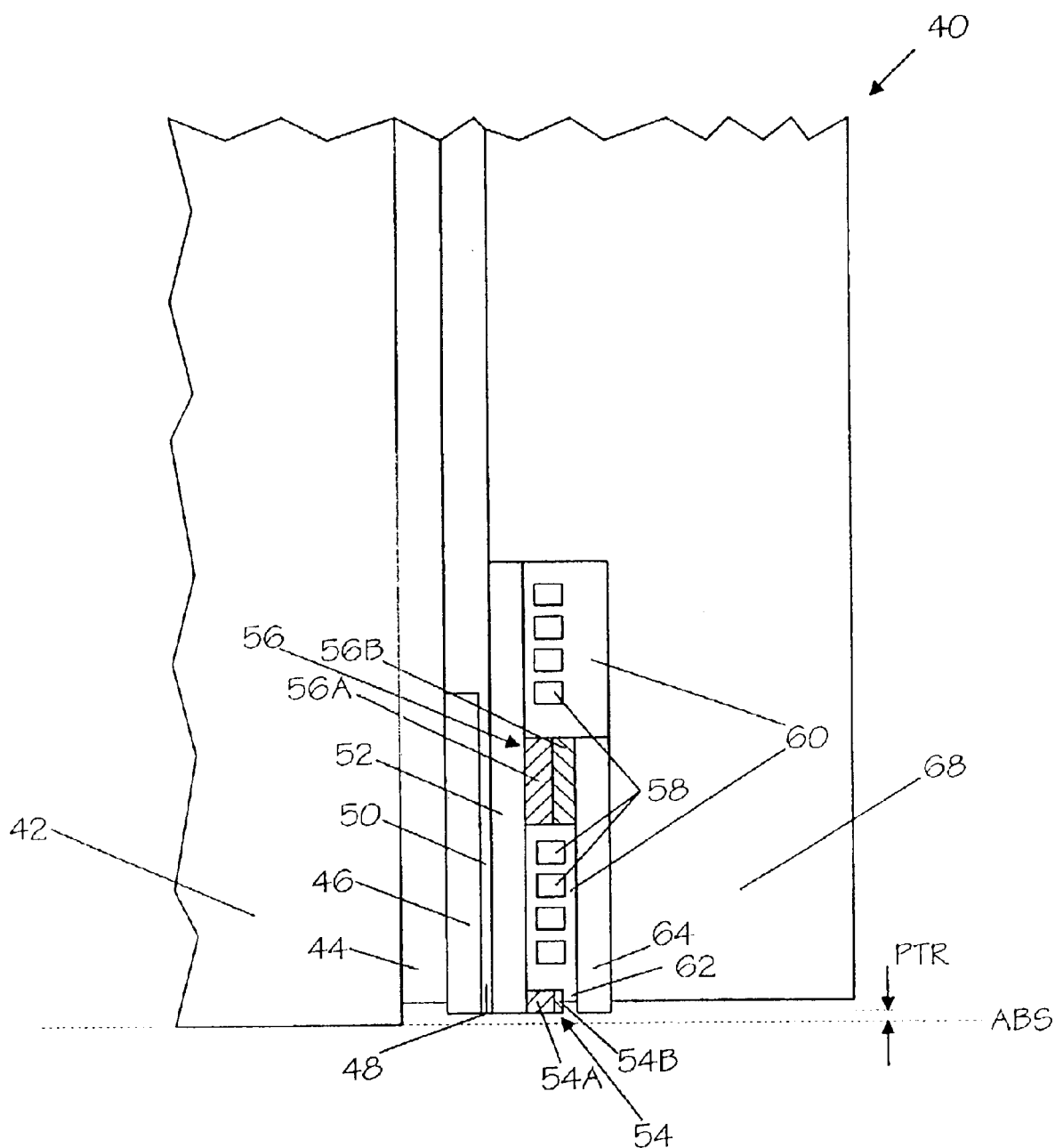
FIG. 3 is a cross-sectional view of the transducing head of FIG. 1 for illustrating the concept of Pole Tip Recession.

FIG. 3 is a cross-sectional view of transducing head 40 for illustrating the concept of PTR. As shown in FIG. 3, transducing head 40 is essentially formed of substrate 42, read element 48, a plurality of insulating layers (which include basecoat 44, read gap 50, coil insulator 60, write gap 62, and overcoat 68) and a plurality of metallic layers (which include bottom shield 46, shared pole 52, shared pole extension 54, write via 56, conductive coil 58, and top pole 64).

The insulating layers and metallic layers of transducing head 40 have differing mechanical and chemical properties than substrate 42. As described above in reference to FIG. 1, these differences in properties cause substrate 42, the insulating layers and the metallic layers to each be lapped at different rates. Thus, the lapping of the ABS of transducing head 40 during fabrication causes transducing head 40 to have a uneven ABS. Commonly, a greater amount of the insulating layers will be removed during the lapping process than will be removed from the metallic layers. Similarly, a greater amount of the metallic layers will be removed during the lapping process than will be removed from substrate 42. Thus, the lapping process results in a recession from the ABS of the insulating layers and the metallic layers of transducing head 40 with respect to substrate 42. The PTR of a particular layer is defined as the distance between the ABS of substrate 42 and the ABS of that layer. For clarity, the magnitude of pole tip recession is exaggerated in FIG. 3.

Figure 4:
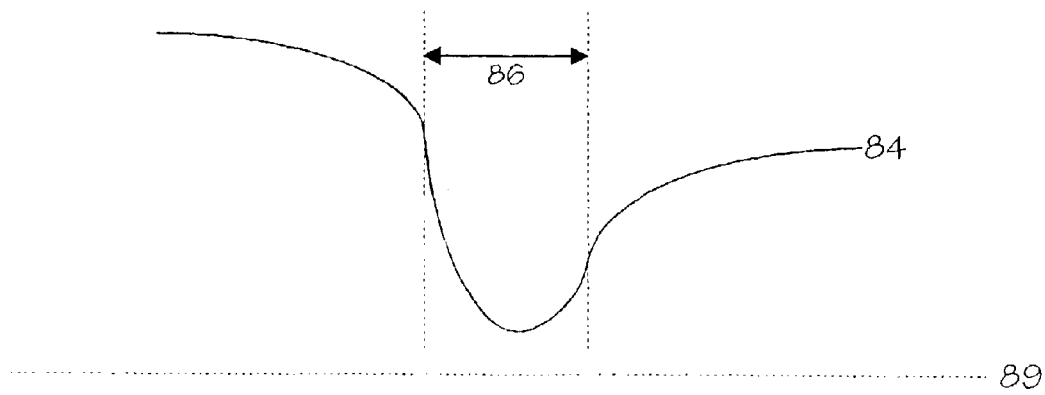
FIG. 4 represents an exaggerated profile of an air bearing surface of a prior art transducing head under high operating temperatures for illustrating the concept of Thermal-Pole Tip Recession.

FIG. 4 represents exaggerated profile 84 of an ABS of a prior art transducing head under high operating temperatures for illustrating the concept of Thermal-Pole Tip Recession. The differing mechanical and chemical properties of the layers of the transducing head affect the ABS during its operation. As the transducing head is operated, it is subjected to increasing temperatures. In addition, a temperature of the transducing head, or a part thereof, may be significantly greater than the temperature within the magnetic data storage and retrieval system in which the transducing head resides due to heat dissipation caused by electrical currents therein.

The CTE of materials used in forming a substrate of the transducing head is typically much smaller than the CTE of materials used in forming the insulating layers and the metallic layers. Due to their larger CTE, the metallic layers will tend to expand a greater amount than will the substrate. Thus, when the transducing head is subjected to higher operating temperatures, the metallic layers tend to protrude closer to the magnetic disc than the substrate, thereby affecting the PTR of the metallic layers. This change in PTR caused by temperature is referred to as the Thermal PTR (T-PTR). As shown in FIG. 4, exaggerated profile 84 illustrates how the greater expansion of the metallic layers over substrate 42 causes the metallic layers in region 86 to come in closer proximity to disc surface 89.

In conclusion, the present invention minimizes the problem of thermal-Pole Tip Recession related to a shared pole extension portion of a transducing head. The bilayer structure of a high magnetic moment material and a material having a CTE similar to that of a substrate on which the transducing head is formed allows for a writer capable of writing to high coercivity media while minimizing the effect of T-PTR of the shared pole extension.

Although the present invention has been described with reference to preferred embodiments, workers skilled in the art will recognize that changes may be made in form and detail without departing from the spirit and scope of the invention.

What is claimed is:

1. A transducing head having an air bearing surface, the transducing head being formed upon a slider and comprising:
   a shared magnetic pole;
   a top magnetic pole;
   a write via extending between the shared magnetic pole and the top magnetic pole, the write via being positioned opposite the air bearing surface; and
   a shared pole extension positioned adjacent the air bearing surface and extending from the shared magnetic pole toward the top magnetic pole, the shared pole extension being separated from the top magnetic pole by a write gap, wherein the shared pole extension is formed of a multilayer comprising a layer of a first material having a high magnetic moment and a layer of a second material having a coefficient of thermal expansion within about 17 percent of a coefficient of thermal expansion of a slider material forming the slider.

2. The transducing head of claim 1 wherein the first material has a magnetic moment greater than 2.1 Tesla.

3. The transducing head of claim 1 wherein the first material is 2.2 Tesla NiCoFe.

4. The transducing head of claim 1 wherein the slider material is AlTiC.

5. The transducing head of claim 4 wherein the second material is NiCoFe.

6. The transducing head of claim 4 wherein the second material is selected from the group consisting of $Ni_{45}Fe_{55}$, $Ni_{31.5}Fe_{68.5}$, $Ni_{36.5}Co_{10}Fe_{53.5}$, $Ni_{28}Co_{10}Fe_{62}$, and $Ni_{28}Co_{20}Fe_{52}$.

7. The transducing head of claim 1 wherein a thickness of the layer of the first material is at least about one-third a thickness of the shared pole extension.

8. The transducing head of claim 1 wherein a thickness of the layer of the first material is less than about two-thirds a thickness of the shared pole extension.

9. The transducing head of claim 1 wherein the write via is formed of a multilayer comprising a layer of the first material and a layer of the second material.

10. In a transducing head formed on a slider and comprising:
    a shared magnetic pole;
    a top magnetic pole;
    a write via extending between the shared magnetic pole and the top magnetic pole, the write via being positioned opposite an air bearing surface of the transducing head;
    a shared pole extension positioned adjacent the air bearing surface and extending from the shared magnetic pole toward the top magnetic pole, the shared pole extension being separated from the top magnetic pole by a write gap;
    an improvement comprising the shared pole extension comprising:
       a first layer composed of a first material having a high magnetic moment; and
       a second layer composed of a second material having a coefficient of thermal expansion within about 17 percent of a coefficient of thermal expansion of a slider material forming the slider.

11. The transducing head of claim 10 wherein the first material has a magnetic moment greater than 2.1 Tesla.

12. The transducing head of claim 10 wherein the first material is 2.2 Tesla NiCoFe.

13. The transducing head of claim 10 wherein the slider material is AlTiC.

14. The transducing head of claim 13 wherein the second material is NiCoFe.

15. The transducing head of claim 13 wherein the second material is selected from the group consisting of $Ni_{45}Fe_{55}$, $Ni_{31.5}Fe_{68.5}$, $Ni_{36.5}Co_{10}Fe_{53.5}$, $Ni_{28}Co_{10}Fe_{62}$, and $Ni_{28}Co_{20}Fe_{52}$.

16. The transducing head of claim 10 wherein a thickness of the first layer is at least about one-third a thickness of the shared pole extension.

17. The transducing head of claim 10 wherein a thickness of the first layer is less than about two-thirds a thickness of the shared pole extension.

18. The transducing head of claim 10 wherein the write via is formed of a multilayer structure comprising a first layer of the first material and a second layer of the second material.

19. A transducing head formed upon a slider and having an air bearing surface, the slider being formed of a slider material having a coefficient of thermal expansion equal to about $7.90 \times 10^{-6}/°$ C., the transducing head comprising:
    a shared magnetic pole;
    a top magnetic pole;
    a write via extending between the shared magnetic pole and the top magnetic pole, the write via being positioned opposite the air bearing surface; and
    a shared pole extension positioned adjacent the air bearing surface and extending from the shared magnetic pole toward the top magnetic pole, the shared pole extension being separated from the top magnetic pole by a write gap, wherein the shared pole extension is formed of a multilayer comprising a layer of a first material having a high magnetic moment and a layer a second material having a coefficient of thermal expansion in a range of about $6.54 \times 10^{-6}/°$ C. to about $8.06 \times 10^{-6}/°$ C.

20. A transducing head having an air bearing surface, the transducing head being formed upon an AlTiC slider and comprising:

a shared magnetic pole;

a top magnetic pole;

a write via extending between the shared magnetic pole and the top magnetic pole, the write via being positioned opposite the air bearing surface; and a shared pole extension positioned adjacent the air bearing surface and extending from the shared magnetic pole toward the top magnetic pole, the shared pole extension being separated from the top magnetic pole by a write gap, wherein the shared pole extension is formed of a multilayer comprising a layer of a first material having a high magnetic moment and a layer a second material selected from the group consisting of $Ni_{45}Fe_{55}$, $Ni_{31.5}Fe_{68.5}$, $Ni_{36.5}Co_{10}Fe_{53.5}$, $Ni_{28}Co_{10}Fe_{62}$, and $Ni_{28}Co_{20}Fe_{52}$.

* * * * *